United States Patent [19]

Brown et al.

[11] Patent Number: 4,935,472

[45] Date of Patent: Jun. 19, 1990

[54] SOLVENT-RESISTANT, COMPATIBLE BLENDS OF POLYPHENYLENE ETHERS, AND THERMOPLASTIC POLY-ESTER MIXTURES

[75] Inventors: Sterling B. Brown, Schenectady; Richard C. Lowry, Clifton Park, both of N.Y.

[73] Assignee: General Electric Company, Schenectady, N.Y.

[21] Appl. No.: 314,267

[22] Filed: Feb. 24, 1989

Related U.S. Application Data

[63] Continuation of Ser. No. 173,789, Mar. 28, 1988, abandoned.

[51] Int. Cl.$^5$ .................. C08L 69/00; C08L 71/12
[52] U.S. Cl. .......................... 525/394; 525/67; 525/68; 525/92; 525/397; 525/905
[58] Field of Search .................. 525/394, 397, 905

[56] References Cited

U.S. PATENT DOCUMENTS

3,953,394  4/1976  Fox et al. ........................ 525/446

FOREIGN PATENT DOCUMENTS

87850  8/1986  World Int. Prop. O. .

*Primary Examiner*—Jacob Ziegler
*Attorney, Agent, or Firm*—William H. Pittman; James C. Davis, Jr.

[57] ABSTRACT

Solvent-resistant resin blends with a wide variety of desirable impact and tensile properties are prepared from a polyphenylene ether having a low proportion of unneutralized amino nitrogen, a mixture of a poly(alkylene dicarboxylate) and a polyarylate, an aromatic polycarbonate as a compatibilizing agent, and, optionally, at least one elastomeric polyphenylene ether-compatible impact modifier.

10 Claims, No Drawings

SOLVENT-RESISTANT, COMPATIBLE BLENDS OF POLYPHENYLENE ETHERS, AND THERMOPLASTIC POLY-ESTER MIXTURES

This application is a continuation of application Ser. No. 173,789, filed Mar. 28, 1988, now abandoned.

This invention relates to novel resinous compositions with high impact strength, resistance to solvents and thermal distortion, tensile strength and thermal stability. More particularly, it relates to improved compositions comprising polyphenylene ethers and thermoplastic polyesters.

The polyphenylene ethers are a widely used class of thermoplastic engineering resins characterized by excellent hydrolytic stability, dimensional stability, toughness, heat resistance and dielectric properties. They are also resistant to high temperature conditions under many circumstances. Because of the brittleness of many compositions containing polyphenylene ethers, they are frequently blended with impact modifiers such as elastomers to form molding compositions.

There has been considerable interest in recent years in compositions comprising polyphenylene ethers in combination with other resins having desirable properties. Illustrative of such resins are the thermoplastic polyesters including polyarylates and poly(alkylene dicarboxylates), especially the poly(alkylene terephthalates). However, such blends frequently undergo phase separation and delamination. They typically contain large, incompletely dispersed polyphenylene ether particles and no phase interaction between the two resin phases. Molded parts made from such blends are typically characterized by extremely low impact strength.

The present invention provides polymer blends having excellent impact and/or tensile properties even after being subjected to prolonged heating cycles during injection molding and the like. It also provides highly compatible polymer blends containing polyphenylene ethers, polyarylates and poly(alkylene dicarboxylates), and resinous molding compositions prepared therefrom.

The invention is based on the discovery of a new genus of compatible blends containing polyphenylene ethers, polyarylates and poly(alkylene dicarboxylates), and a method for their preparation. According to the invention, there is also incorporated in the resinous composition an aromatic polycarbonate as a compatibilizing agent.

In one of its aspects, therefore, the invention is directed to resinous compositions comprising the following resinous components and any reaction products thereof, all percentage proportions being by weight of total resinous components:

(A) about 25–60% of at least one polyphenylene ether containing at most 800 ppm. of unneutralized amino nitrogen;

(B) about 30–60% of a polyester mixture comprising (B-1) about 40–95%, based on total polyester, of a polymer consisting essentially of structural units of the formula $$-O-R^1-O-\overset{O}{\underset{\|}{C}}-A^1-\overset{O}{\underset{\|}{C}}-, \quad (I)$$

and (B-2) about 5–60% of a polymer consisting essentially of structural units of the formula $$-O-A^2-Y-A^3-O-\overset{O}{\underset{\|}{C}}-A^1-\overset{O}{\underset{\|}{C}}-, \quad (II)$$

wherein:

$R^1$ is a saturated $C_2$ to $_{10}$ divalent aliphatic or alicyclic hydrocarbon radical;

each of $A_1$, $A^2$ and $A^3$ is independently a monocyclic divalent aromatic radical; and Y is a bridging radical in which one or two atoms separate $A^2$ from $A^3$; and (C) about 5–20% of at least one aromatic polycarbonate having a weight average molecular weight of at least about 45,000 as determined by gel permeation chromatography relative to polystyrene.

It is not certain whether any or all of the components in these compositions interact chemically upon blending. Therefore, the invention includes compositions comprising said components and any reaction products thereof, as well as other optional components described hereinafter.

The polyphenylene ethers (also known as polyphenylene oxides) used as component A in the present invention comprise a plurality of structural units having the formula

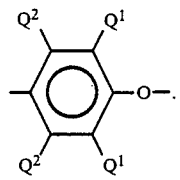

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 and preferably at least 0.25 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon upon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be used in the invention include those which comprise molecules having at least one of the end groups of the formulas

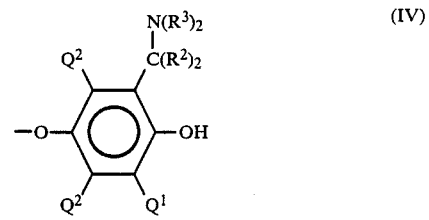

and

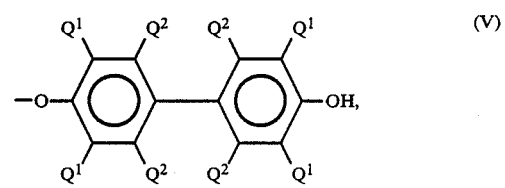

$Q^1$ and $Q^2$ are as previously defined; each $R^2$ is independently hydrogen or alkyl, with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the end groups of formula IV (hereinafter "aminoalkyl end groups") may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl end groups may undergo various reactions, probably involving a quinone methide-type intermediate of the formula

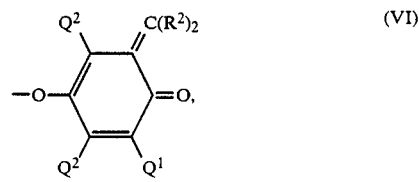

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula V are typically obtained from reaction mixtures in which a by-product diphenoquinone of the formula

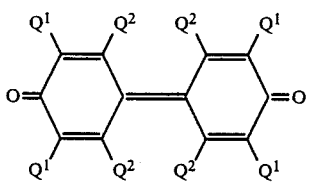

(VII)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas IV and V. In particular, polyphenylene ethers originally containing at least about 60% by weight of molecules having aminoalkyl end groups of formula V are contemplated for use in the present invention.

The use of polyphenylene ethers containing substantial amounts of unneutralized amino nitrogen generally affords compositions with undesirably low impact strengths. The possible reasons for this are explained hereinafter. The amino compounds include, in addition to the aforementioned aminoalkyl end groups, traces of amine (particularly secondary amine) in the catalyst used to form the polyphenylene ether.

According to the present invention, therefore, a substantial proportion of any amino compounds in the polyphenylene ether is removed or inactivated. Polymers so treated are sometimes referred to hereinafter as "inactivated polyphenylene ethers". They contain unneutralized amino nitrogen, if any, in amounts no greater than 800 ppm. and more preferably in the range of about 100–800 ppm. Various means for inactivation have been developed and any one or more thereof may be used.

One such method is to precompound the polyphenylene ether with at least one non-volatile compound containing a carboxylic acid, acid anhydride or ester group, which is capable of neutralizing the amine compounds. This method is of particular interest in the preparation of compositions of this invention having high resistance to heat distortion. Illustrative acids, anhydrides and esters are citric acid, malic acid, agaricic acid, succinic acid, succinic anhydride, maleic acid, maleic anhydride, diethyl maleate, citraconic acid, citraconic anhydride, itaconic acid, itaconic anhydride, fumaric acid, methyl fumarate and pyromellitic dianhydride. Because of their relatively high reactivity with amino compounds, the free carboxylic acids and their anhydrides, especially fumaric acid and pyromellitic dianhydride, are generally most useful. Polyphenylene ether-pyromellitic dianhydride compositions are disclosed and claimed in copending, commonly owned application Ser. No. [RD-17482].

Reaction of the polyphenylene ether with the acid or anhydride may be achieved by heating at a temperature within the range of about 230°–390° C., in solution or preferably in the melt. In general, about 0.3–2.0 and preferably about 0.5–1.5 parts (by weight) of acid or anhydride is employed per 100 parts of polyphenylene ether. Said reaction may conveniently be carried out in an extruder or similar equipment.

Another method of inactivation is by extrusion of the polyphenylene ether under the above-described conditions with vacuum venting. This may be achieved either in a preliminary extrusion step (which is sometimes preferred) or during extrusion of the composition of this invention, by connecting the vent of the extruder to a vacuum pump capable of creating a pressure of about 200 torr or less.

It is believed that these inactivation methods aid in the removal by evaporation or the neutralization of any traces of free amines (predominantly secondary amines) in the polymer, including amines generated by conversion of aminoalkyl end groups to quinone methides of the type represented by formula VI. Polyphenylene ethers having a free amine nitrogen content below about 600 ppm. have been found particularly useful in this invention. However, the invention is not dependent on any theory of inactivation.

Component B is a mixture of at least two thermoplastic polyesters, one being a poly(alkylene dicarboxylate) and the other being a polyarylate. Component B-1, the poly(alkylene dicarboxylate), consists essentially of structural units of formula I. The $R^1$ value therein is a $C_{2-10}$ saturated divalent aliphatic or alicyclic hydrocarbon radical, usually ethylene or tetramethylene, and $A^1$ is a divalent monocyclic aromatic radical and preferably m- or p-phenylene.

These polyesters generally have number average molecular weights in the range of about 20,000–70,000, as determined by intrinsic viscosity (IV) at 30° C. in a mixture of 60% phenol and 40% 1,1,2,2-tetrachloroethane by weight. When resistance to heat distortion is an important factor the polyester molecular weight should be relatively high, typically above about 40,000.

Such polyesters are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. Poly(ethylene terephthalate) and poly(butylene terephthalate), and especially the latter, are preferred; they are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526. |

Component B-2 is a polyarylate consisting essentially of units of formula II, wherein each of $A^2$ and $A^3$ is an aromatic radical similar to $A^1$. Most often, $A^2$ and $A^3$ are both p-phenylene.

The bridging radical, Y, is one in which one or two atoms, preferably one, separate $A^1$ from $A^2$. It is most often a hydrocarbon radical and particularly a saturated $C_{1-12}$ aliphatic or alicyclic radical such as methylene, cyclohexylmethylene, 2-[2.2.1]bicycloheptylmethylene, ethylene, ethylidene, 2,2-propylidene, 1,1-(2,2-dimethylpropylidene), cyclohexylidene, cyclopentadecylidene, cyclododecylidene or 2,2-adamantylidene, especially an alkylidene radical. Aryl-substituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group.

The polyarylate may be prepared by conventional methods, typically by the reaction of a bisphenol with a dicarboxylic acid or functional derivative thereof. The following bisphenols are illustrative:

Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
60, α, -Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide.

Bisphenol A is ordinarily preferred by reason of its availablity and particular suitability.

Component B-2 is most often a bisphenol A isophthalate, terephthalate or mixed isophthalate-terephthalate. It generally has an intrinsic viscosity in the range of about 0.5–1.0 dl./g., as determined under the conditions described hereinabove with reference to poly(alkylene dicarboxylates).

As previously mentioned, the proportions of the individual polyesters in component B are about 40–95% of component B-1 and about 5–60% of component B-2.

Polyesters tend to undergo hydrolytic degradation at the high extrusion and molding temperatures encountered by the compositions of this invention. Therefore, it is preferred that the polyester used as component B be substantially free of water.

According to the present invention, the tendency of blends of components A and B to be incompatible is overcome by incorporating in the composition (C) at least one aromatic polycarbonate, preferably a homopolycarbonate. The structural units in such homopolycarbonate generally have the formula

wherein $A^4$ is an aromatic radical. Suitable $A^4$ values include m-phenylene, p-phenylene, 4,4'-biphenylene, 2,2-bis(4-phenylene)propane, 2,2-bis(3,5-dimethyl-4-phenylene)propane and similar radicals such as those which correspond to the dihydroxyaromatic compounds disclosed by name or formula (generic or specific) in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A^4$ radicals are hydrocarbon radicals.

The $A^4$ radicals preferably have the formula

wherein each of $A^5$ and $A^6$ is a monocyclic divalent aromatic radical and Y is as previously defined. The free valence bonds in formula IX are usually in the meta or para positions of $A^5$ and $A^6$ in relation to Y. Such $A^4$ values may be considered as being derived from bisphenols such as those previously described, especially bisphenol A.

Any known method of preparing homopolycarbonates may be used for preparing component C. Included are interfacial and other methods in which phosgene is reacted with bisphenols, transesterification methods in which bisphenols are reacted with diaryl carbonates, and methods involving conversion of cyclic polycarbonate oligomers to linear polycarbonates. The latter method is disclosed in U.S. Pat. No. 4,644,053.

For the purposes of this invention, polycarbonates having a weight average molecular weight of at least about 45,000 (as determined by gel permeation chromatography relative to polystyrene) are employed. A molecular weight of at least about 55,000 is preferred, and one of at least about 70,000 is especially preferred.

Because high impact strength is frequently an important property of the compositions of this invention, it is often preferred to incorporate therein (D) at least one elastomeric polyphenylene ether-compatible impact modifier. Suitable impact modifiers include various elastomeric copolymers, of which examples are ethylene-propylene-diene polymers (EPDM's), both unfunctionalized and functionalized with (for example) sulfonate or phosphonate groups; carboxylated ethylene-propylene rubbers; block copolymers of alkenylaromatic compounds such as styrene with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network. Such core-shell elastomers are more fully disclosed in U.S. Pat. No. 4,681,915.

The preferred impact modifiers are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene end blocks and diene-derived midblocks. It is frequently advantageous to remove (preferably) or decrease the aliphatic unsaturation therein by selective hydrogenation. The weight average molecular weights of the impact modifiers are typically in the range of about 50,000-300,000. Block copolymers of this type are commercially available from Shell Chemical Company under the trademark KRATON, and include KRATON D1101, G1650, G1651, G1652, G1657 and G1702.

Components A and B are present in the amounts of about 25-60% and about 30-60%, respectively, of total resinous components. Most often, component A comprises about 25-30% and component B about 45-60%%. When high impact strength is desired, the weight ratio of component A to component B should be at most about 1.2:1. Component D, the elastomeric impact modifier, is employed when present in the amount of about 5-25% and especially about 10-20%.

The chemical role of the inactivated polyphenylene ether in the compositions of this invention is not fully understood, and any reliance on chemical theory as a basis for the invention is specifically disclaimed. It is believed, however, that the presence of more than a certain minimum proportion of amino compounds in the polyphenylene ether can cause degradation in the molecular weight of the polycarbonate and/or polyester. If this is true, the removal or neutralization of the greater part of such amino compounds produces an environment in which high molecular weight is maintained in the polycarbonate (thus maximizing its effect as a compatibilizing agent) and polyester.

It is within the scope of the invention for the composition to contain other conventional ingredients such as fillers, flame retardants, pigments, dyes, stabilizers, antistatic agents, mold release agents and the like. The presence of other resinous components is also contemplated. These include impact modifiers compatible with component B, such as various graft and core-shell copolymers of such monomers as butadiene, styrene, butyl acrylate and methyl methacrylate. It is frequently preferred to preextrude such impact modifiers with component B prior to its utilization in the invention. By this method, compositions having improved ductility at low temperatures may be prepared.

Also included as other resinous components are other impact and processability modifiers for component A, such as olefin copolymers. In general, the amounts of any other resinous components, if present, will not exceed about 15% by weight of total resin.

The preparation of the compositions of this invention is normally achieved by merely blending the ingredients thereof under conditions adapted for the formation of an intimate blend. Such conditions often include extrusion, which may be conveniently effected in a screw-type or similar extruder which applies a substantial shearing force to the composition, thereby decreasing the particle size thereof. The extrusion temperature is generally in the range of about 100°-325° C.

In one embodiment of the invention, a single extruder is employed which has at least two ports for introduction of ingredients, one such port being downstream from the other. Component A or any reactants for preparation thereof and at least a portion of component D (when employed) are introduced through the first port and extruded, preferably at a temperature in the range of about 300°-350° C. This portion of the extruder is preferably vacuum vented.

The remaining ingredients are introduced through the downstream port and extrusion is continued, preferably at a lower temperature to minimize degradation of components B, C and D. For further minimization of degradation, it may be advantageous to introduce a portion of component D at this point. Typical extrusion temperatures at this stage are in the range of about 260°-320° C.

The invention is illustrated by the following examples. Percentages are by weight and are based on total resinous constituents. Impact and tensile values were determined in British units and have been converted to metric units. Heat distortion temperatures were determined at 0.455 MPa. unless otherwise indicated.

EXAMPLES 1-6

A series of compositions according to the invention was prepared from the following:

Component A - a poly(2,6-dimethyl-1,4-phenylene ether) having a number average molecular weight of about 20,000 and an intrinsic viscosity in chloroform at 25° C. of 0.46 dl./g., which has been extruded on a twin screw extruder within the temperature range of about 300°-315° C., with vacuum venting to a maximum pressure of 20 torr; it contained 438 ppm. nitrogen.

Component B:

PBT - a poly(butylene terephthalate) having a number average molecular weight of about 50,000, as determined by gel permeation chromatography.

Polyarylate - a commercially available bisphenol A isophthalate-terephthalate in which the acid moieties are present in equimolar amounts, having an intrinsic viscosity of 0.71 dl./g.

Component C - a bisphenol A homopolycarbonate prepared interfacially and having a weight average molecular weight of about 192,000.

Component D - a commercially available triblock copolymer with polystyrene end blocks having weight average molecular weights of 29,000 and a hydrogenated butadiene midblock having a weight average molecular weight of 116,000.

The ingredients were tumble mixed in a jar mill for ½ hour and extruded at 120°-260° C. on a twin screw extruder with a screw speed of 400 rpm. The extrudate was quenched in water and pelletized. The pellets were then injection molded into test bars which were evaluated for notched Izod impact strength (ASTM procedure D256), heat distortion temperature (ASTM procedure D648) and tensile properties (ASTM procedure D638). The relevant parameters and test results are given in the following table.

| | Example | | | | | |
|---|---|---|---|---|---|---|
| | 1 | 2 | 3 | 4 | 5 | 6 |
| Component A, % | 30 | 30 | 30 | 35 | 40 | 34.7 |

-continued

| | Example | | | | | |
|---|---|---|---|---|---|---|
| | 1 | 2 | 3 | 4 | 5 | 6 |
| Component B, %: | | | | | | |
| PBT | 23 | 28 | 41 | 21 | 18 | 26.7 |
| Polyarylate | 23 | 18 | 5 | 20 | 18 | 26.7 |
| Component C, % | 10 | 10 | 10 | 10 | 10 | 12 |
| Component D, % | 14 | 14 | 14 | 14 | 14 | — |
| Izod impact strength, joules/m. | 764 | — | — | 64 | 203 | 32 |
| Tensile strength, MPa.: | | | | | | |
| At break | 49.4 | 45.0 | 39.6 | — | — | 59.6 |
| At yield | 49.1 | 44.5 | 41.4 | — | — | 64.7 |
| Tensile elongation, % | 121 | 121 | 143 | — | — | 110 |
| Heat distortion temp., °C. | 100 | — | 135 | 118 | 126 | 94 |

EXAMPLE 7

Test bars of the composition of Example 1 were immersed in gasoline for three days under stress. At the end of this time, the Izod impact strength was 459 joules/m.

What is claimed is:

1. A resinous composition comprising the following resinous components, all percentage proportions being by weight of total resinous components:
   (A) about 25-60% of at least one polyphenylene ether containing at most 800 ppm. of unneutralized amino nitrogen;
   (B) about 30-60% of a polyester mixture comprising (B-1) about 40-95%, based on total polyester, of a polymer consisting essentially of structural units of the formula

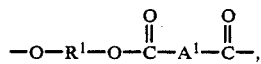 (I)

and (B-2) about 5-60% of a polymer consisting essentially of structural units of the formula

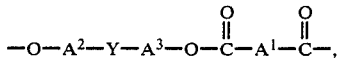 (II)

wherein:
   $R^1$ is a saturated $C_{2-10}$ divalent aliphatic or alicyclic hydrocarbon radical;
   each of $A^1$, $A^2$ and $A^3$ is independently a monocyclic divalent aromatic radical; and
   Y is a bridging radical in which one or two atoms separate $A^2$ from $A^3$; and
   (C) about 5-20% of at least one aromatic polycarbonate having a weight average molecular weight of at least about 45,000 as determined by gel permeation chromatography relative to polystyrene, said polycarbonate consisting essentially of structural units having the formula

 (VIII)

wherein $A^4$ is an aromatic hydrocarbon radical.

2. A composition according to claim 1 wherein component A comprises a plurality of structural units having the formula

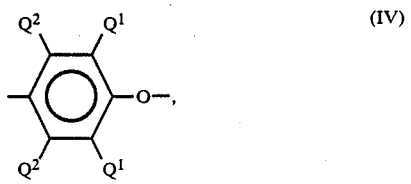 (IV)

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen halogen, primary or secondary lower alkyl, phenyl, haloalkyl, hydrocarbonoxy or halohydrocarbonoxy as defined for $Q^1$.

3. A composition according to claim 2 wherein component A is a poly(2,6-dimethyl-1,4-phenylene ether).

4. A composition according to claim 3 wherein the weight ratio of component A to component B is at most about 1.2:1.

5. A composition according to claim 4 wherein component B-1 is poly(ethylene terephthalate) or poly(butylene terephthalate).

6. A composition according to claim 5 wherein component B-2 is a bisphenol A isophthalate, terephthalate or mixed isophthalate-terephthalate.

7. A composition according to claim 6 wherein component C is a bisphenol A polycarbonate.

8. A composition according to claim 7 wherein component C has a molecular weight of at least about 70,000.

9. A composition according to claim 8 wherein component B-1 is a poly(butylene terephthlate) having a number average molecular weight in the range of about 20,000-70,000.

10. A composition according to claim 9 wherein component B-2 has an intrinsic viscosity in the range of about 0.5-1.0 dl./g., as determined at 30° C. in a mixture of 60% phenol and 40% 1,1,2,2-tetrachloroethane by weight.

* * * * *